(12) United States Patent
Barkus (10) Patent No.: US 7,399,123 B2
(45) Date of Patent: Jul. 15, 2008

(54) OPTICAL FIBER CONNECTOR WITH MOLDED LOCKING COMPONENT

(75) Inventor: Lee Andrew Barkus, Millersburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 130 days.

(21) Appl. No.: 10/579,264

(22) PCT Filed: Nov. 12, 2004

(86) PCT No.: PCT/US2004/038152

§ 371 (c)(1),
(2), (4) Date: May 12, 2006

(87) PCT Pub. No.: WO2005/050261

PCT Pub. Date: Jun. 2, 2005

(65) Prior Publication Data

US 2007/0133927 A1 Jun. 14, 2007

(51) Int. Cl.
*G02B 6/36* (2006.01)
*G02B 6/38* (2006.01)
(52) U.S. Cl. .............................. 385/56; 385/66; 385/75; 385/76; 385/84
(58) Field of Classification Search ............. 385/53–87, 385/13
See application file for complete search history.

(56) References Cited

U.S. PATENT DOCUMENTS

| 5,394,494 | A | 2/1995 | Jennings et al. ................ 385/58 |
| 5,737,464 | A | 4/1998 | Underwood et al. .......... 385/72 |
| 7,207,729 | B2 * | 4/2007 | Blom et al. .................... 385/90 |
| 2003/0161586 | A1 * | 8/2003 | Hirabayashi ................. 385/78 |

FOREIGN PATENT DOCUMENTS

JP 02114214 A * 4/1990

* cited by examiner

*Primary Examiner*—M. R. Connelly-Cushwa (57) ABSTRACT

Provided are optical fiber connectors having top and bottom, front and back orientation comprising: a jacketed optical cable comprising a terminating fiber (11), the cable having molded thereon a locking component (13) comprising at least one locking lug (14), the locking component (13) being formed from a flexible moldable material; and an inner housing (18) having a radial cross-section which is generally rectilinear and comprises at least three corners, the inner housing (18) comprising at least a portion which defines an opening (25) for receiving the locking component (13), the opening (25) being configured such that upon insertion of the locking component (13) therein the locking lug (14) in a corner of the inner housing (18) such that the locking component (13) and inner housing (18) are secured to each other in an axial direction.

27 Claims, 8 Drawing Sheets

OPTICAL FIBER CONNECTOR WITH MOLDED LOCKING COMPONENT

FIELD OF INVENTION

The present invention relates generally to an optical fiber connector, and, more specifically, to an optical fiber connector comprising an over-molded locking component which secures the fiber to the connector.

BACKGROUND OF INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (herein "mating device"). This way, the light from one fiber is optically coupled to the optical path of the mating device.

A typical connector comprises a jacketed optical cable having a terminating optical fiber end which is secured within a housing comprising a ferrule designed to hold the fiber. The ferrule is biased forward in the housing such that, when the connector is mated to the device, the fiber in the ferrule urges against the optical path of the mating device.

Applicants have recognized there is a on-going need to produce optical fiber connectors at a lower-cost than current connectors found on the market. The highly competitive nature of the connector industry drives connector manufacturers to seek out methods for producing connectors that are not only suitable for a given application, but can be made and sold at a lower, industrially-competitive cost.

Figure 7:
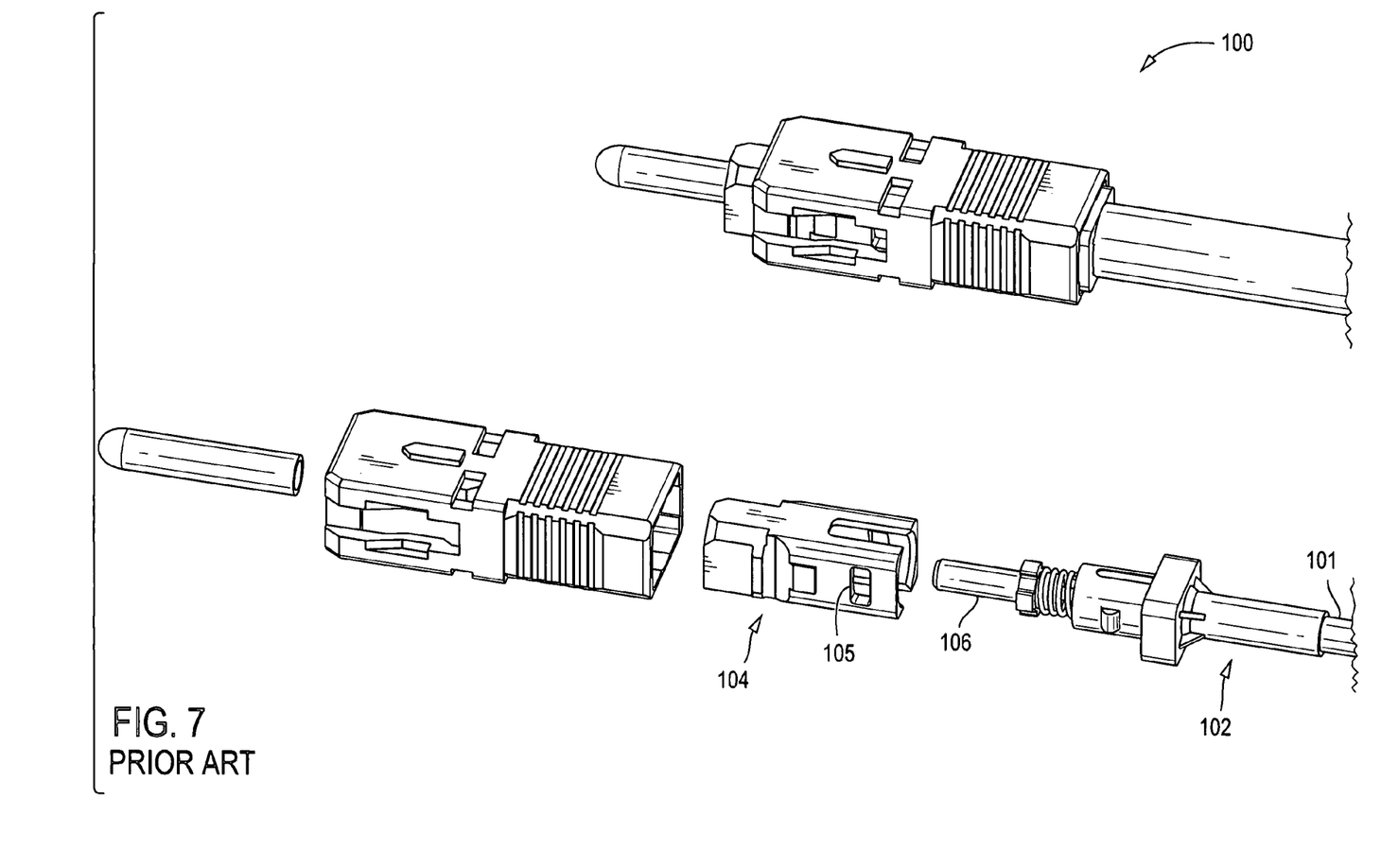
FIGS. 7 and 8 show multiple views of a prior art rigid snap-fit-type connector.
Figure 8:
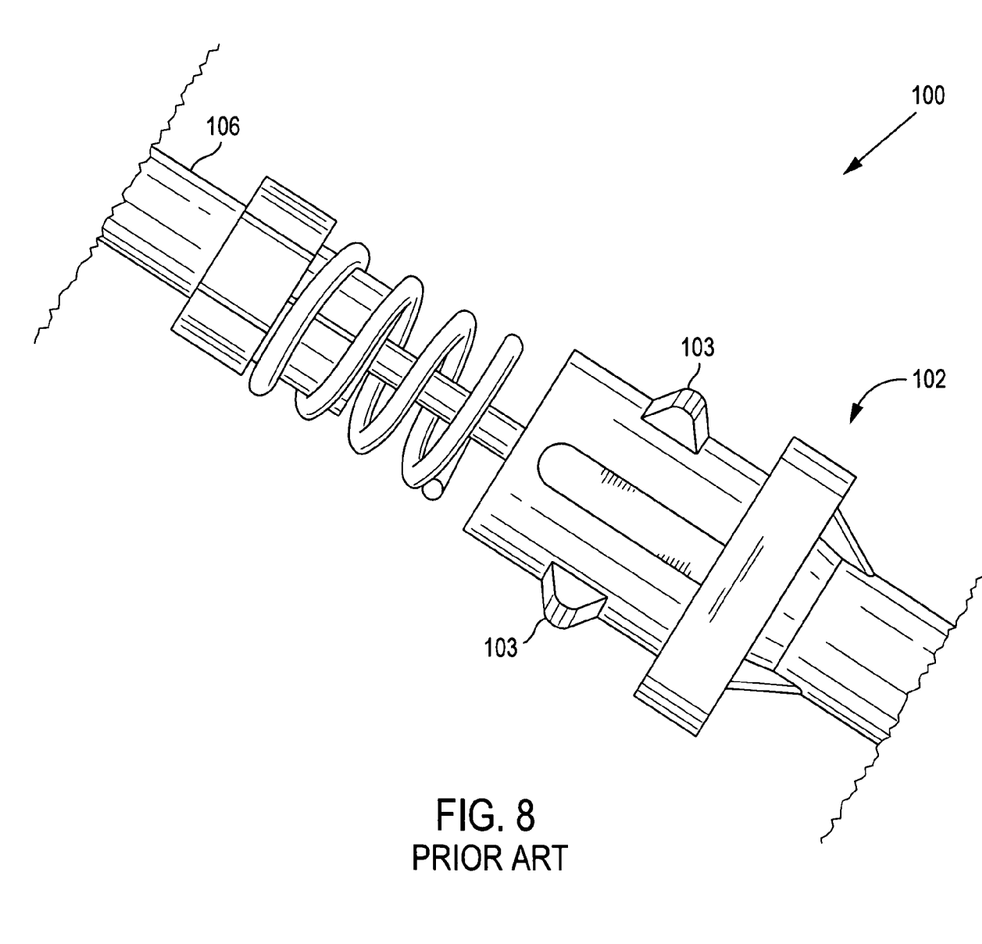

One attempt in the art to produce a low-cost connector is the prior art Fiber-Conn SC Multimode connector (100), available from Emerson (Hanover, Md.), an exploded view and an assembled configuration of which is shown in FIG. 7. A closer view of the retainer body of connector 100 is shown in FIG. 8. Connector 100, referred to herein as a "rigid snap-type " connector, comprises a jacketed cable 101 comprising a terminating optical fiber (not shown) and having molded thereon a rigid plastic retainer body 102 comprising one or more protrusions 103. Connector 100 further comprises an inner housing 104 for holding a ferrule 106 and which defines one or more openings 105 each of which is capable of being deflected to receive a protrusion 103. Upon assembly, the ferrule 106 comprising an optical fiber is secured within housing 104 by "snap fitting" the retainer body 102 to housing 104. That is, retainer body 102 is moved in a forward direction into housing 104 such that the protrusions first deflect the housing walls and are then received in the housing openings 105. A small portion of each protrusion 103 thus interferes with a small area of the wall defining an opening 105 to secure the body 102 to the housing 104 via a snap fit.

While the above connector offers some cost-saving features such as using the over-molded snap-fit retainer body 102 to hold an optical fiber in housing 104, applicants have nevertheless identified a number of disadvantages associated with such prior art connector. In particular, applicants have recognized that the configuration of the connector 100 requires the over-molded retainer body to be formed from a material which is highly rigid and expensive. Only a relatively small surface area of the protrusions 103 of body 102 abut and interfere with housing 104 to hold the body 102 and the housing 104 together. Due to the small surface area of the interfering protrusion, such protrusion must be made of a highly rigid material to prevent shearing, flexing, and/or stretching of the protrusion when axial force is applied in an attempt to separate housing 104 from body 102. In addition, the required flexing of the housing 104 upon assembly and disassembly of connector 100 tends to stress the connector components. To avoid degradation thereof, it is necessary to form such components of a material that is highly resilient. A relatively flexible, and less expensive, over-molding material would not work in the body of the prior art connector, because the protrusions formed therefrom, use only a small surface area to interfere with housing 104. A protrusion with such a small surface area would tend to shear, flex, and/or stretch under standard forces, such as the standard load applied in Standard Test TIA 568 B. In addition, components made from a less resilient material would tend to degrade readily upon repeated deflection due to assembly and disassembly of the connector. Accordingly, the prior art connector 100 cannot be adapted to use less expensive flexible materials, and is therefore disadvantageous.

In addition, applicants have recognized that connector 100 tends to be difficult to disassemble and repair, requiring specific tools and excessive time to break the connector and conduct repairs.

Therefore, applicants have identified a need for an optical connector comprising locking mechanism for securing an optical fiber in the connector housing which uses less costly, including less-rigid, materials not suitable for use in conventional locking/securing means, and which also overcomes the other disadvantages associated with conventional rigid snap-fit connectors.

SUMMARY OF THE INVENTION

The present invention overcomes the problems of the prior art by providing a connector comprising an optical fiber that is robustly secured within a connector housing using an over-molded locking component formed from a relatively inexpensive, rubbery, moldable material. More specifically, rather than having the fiber secured to a housing via a rigid snap-fitted, over-molded retainer body, as in the prior art, the present connector uses a low-cost, flexible locking component, over-molded onto an optical cable. The flexible locking component presents an optical fiber, which is readily inserted and positioned within a connector housing, without deflection of the housing or locking component, to secure the optical fiber in the housing.

By avoiding the need for either the housing or locking components to deflect upon insertion of one into the other, the present connectors avoid the stresses associated therewith. Accordingly, this, at least in part, allows for the use of a locking component made of a less rigid material that would normally degrade under repeated deflection.

Moreover, the locking component and housing of the present invention are advantageously configured such that upon insertion of the locking component into the housing, one or more locking protrusions (lugs) can be snugly positioned in a corner of the housing between a forward housing wall and a rearward housing wall to interfere with such housing walls and prevent axial movement between the locking component and housing. By placing the lugs in a corner, applicants have recognized that a larger surface area of the lugs can be used to abut, and interfere with, the walls of the housing. Any axial stresses applied on a positioned lug of the present invention are thus dispersed over a larger area than similar stresses applied to prior art protrusions. Consequently, and the dispersed stresses can be better tolerated by lugs formed from a less rigid material, as in the present invention.

Additionally, in a preferred embodiment, applicants have discovered that the over-molded locking component of the present invention can be formed integrally with a strain relief component. Although many conventional connectors comprise a strain relief component over-molded onto an optical fiber, such components are generally formed separately from other components of the connector, including other over-molded components, because they need to be formed from materials that are more flexible than conventional rigid over-mold plastics (such as that used to form retainer body 102 of prior art connector 100). Accordingly, the production of an over-molded strain relief component for conventional connectors requires additional materials, production steps, time, and costs. Applicants have recognized, however, that the flexible, moldable materials suitable for use in making the locking component of the present invention are likewise suitable for use in making functioning strain relief components. To advantageously save time and costs, the locking component and strain relief component can be formed as a one piece, rather than two, in certain preferred connectors of the present invention.

Therefore, according to one aspect of the present invention, provided is an optical fiber connector having a top and bottom, front and back orientation comprising: (a) a jacketed optical cable comprising a terminating fiber, the optical cable having molded thereon a locking component comprising at least one locking lug, the locking component being formed from a flexible moldable material; and (b) an inner housing having a radial cross-section which is generally rectilinear and comprises at least three corners, the inner housing comprising at least a portion which defines an opening for receiving the locking component, the opening being configured such that upon insertion of the locking component therein the locking component is movable in both forward and radial directions relative to the inner housing to position said at least one locking lug in a corner of the inner housing such that the locking component and inner housing are secured to each other in an axial direction.

In another aspect, the present invention provides for a connector as described above, but further comprising a strain relief member that is formed integrally with the locking component. In a preferred embodiment, the connector comprises: (a) a jacketed optical cable comprising a terminating fiber, the optical cable having molded thereon a molded component comprising a locking portion having at least one locking lug and a strain relief portion, the molded component being formed from a flexible moldable material; and (b) an inner housing having a radial cross-section which is generally rectilinear and comprises at least three corners, the inner housing comprising at least a portion which defines an opening for receiving the locking component, the opening being configured such that upon insertion of the locking component therein the locking component is movable in both forward and radial directions relative to the inner housing to position said at least one locking lug in a corner of the inner housing such that the locking component and inner housing are secured to each other in an axial direction.

DETAILED DESCRIPTION OF INVENTION

Figure 1:
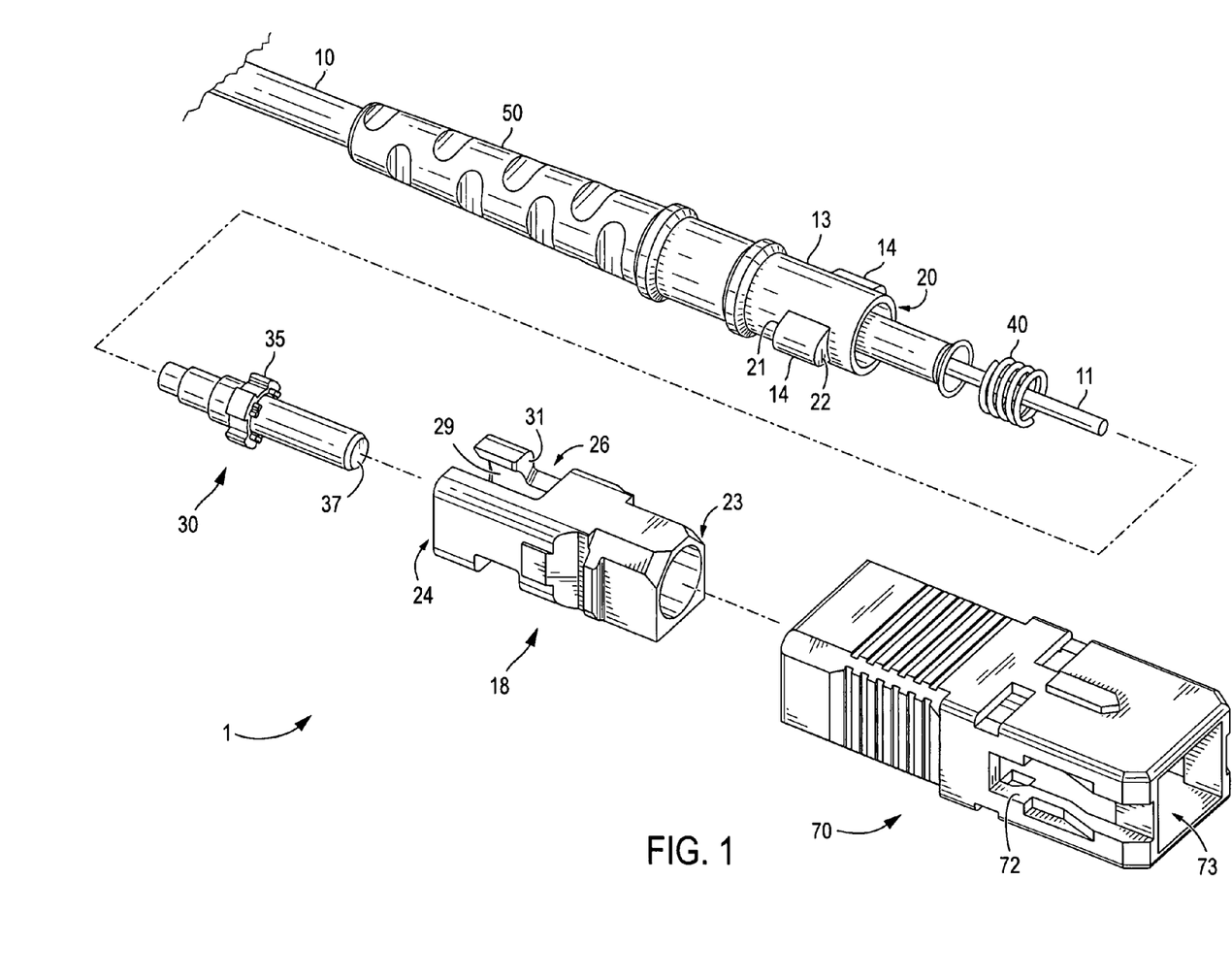
FIG. 1 shows an exploded view of a preferred embodiment of the connector of the present invention.
Figure 2:
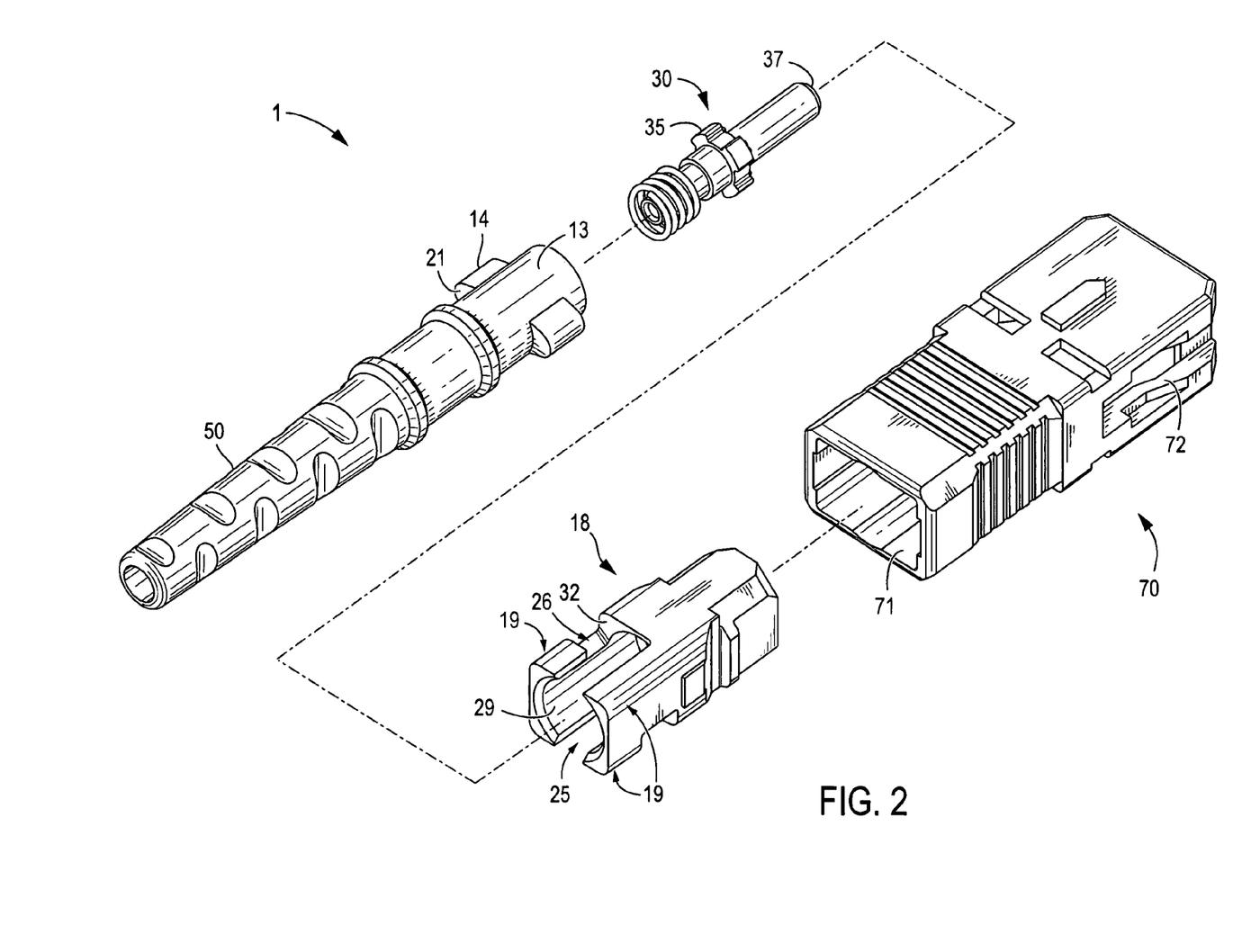
FIG. 2 shows a rear exploded view of a preferred embodiment of the connector of the present invention.
Figure 3:
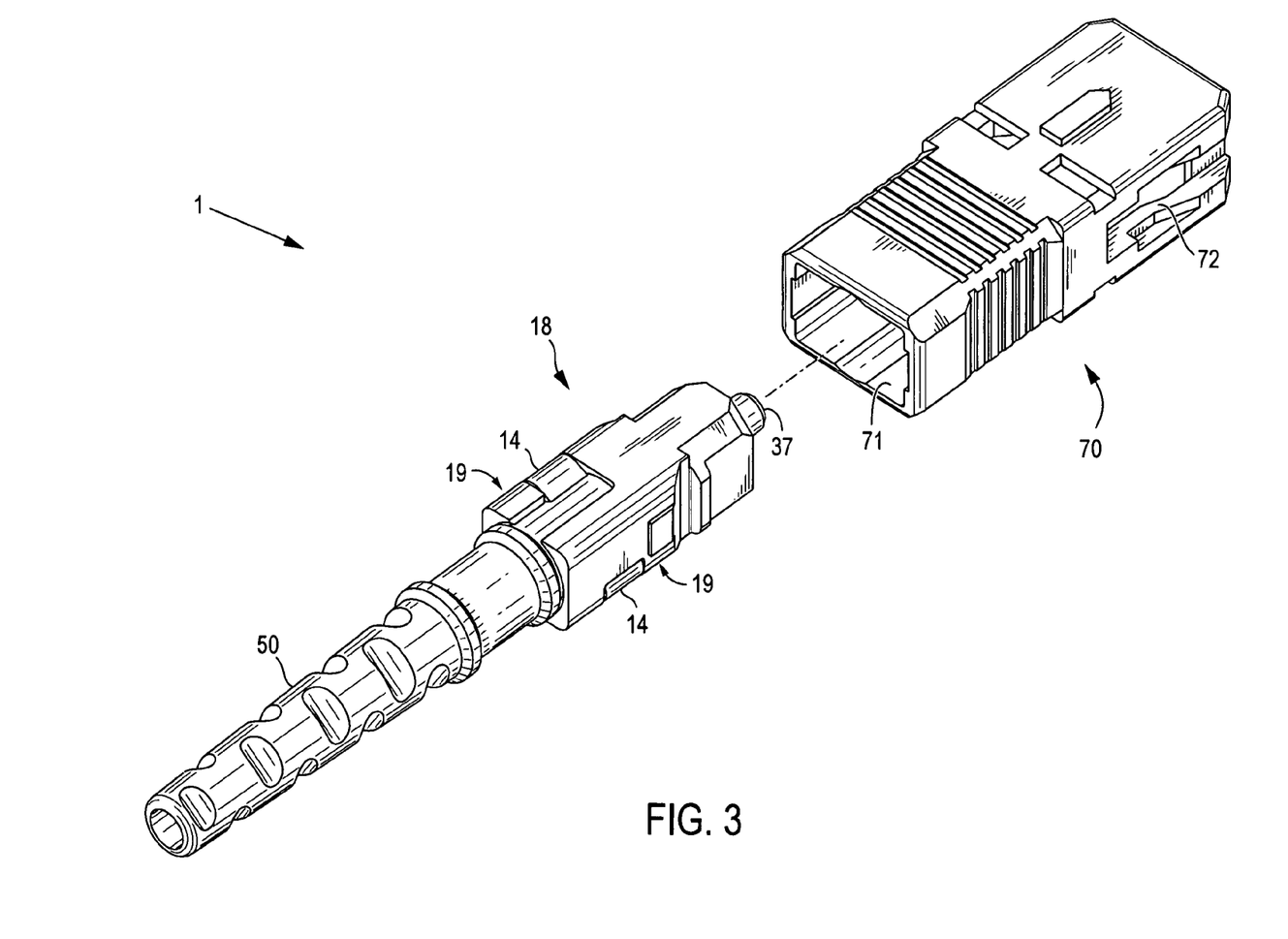
FIG. 3 shows a partially assembled configuration of a preferred embodiment of the connector of the present invention.

Referring to FIGS. 1-3, shown are two exploded views and a partially assembled configuration of a connector according to a preferred embodiment of the present invention. The preferred connector 1 comprises a jacketed optical cable 10 comprising a terminating optical fiber 11, a locking component 13 molded onto cable 10 and having at least one locking lug 14. Connector 1 further comprises an inner housing 18 having a front or plug end 23, a back or cable end 24, and a radial cross-section which is generally rectilinear and comprises at least three corners 19. The inner housing 18 further defines at least one inner chamber 29 having an opening 25 for receiving the locking component 13 and at least one slot 26 for receiving at least one locking lug 14, wherein housing 18 is configured such that upon insertion of locking component 13 therein the locking component 13 is movable in both forward and radial directions relative to the inner housing to position each locking lug 14 in a corner of housing 18 to secure locking component 13 and housing 18 in an axial direction. The connector of the present invention and components thereof are discussed in greater detail below.

The connector depicted in FIGS. 1-3 conforms to the SC type connector standard, accordingly the details of this connector which are common with those of a standard SC-type connector will not be discussed in detail herein. It should be understood, however, that the present invention is not restricted to an SC type connector or any other connector type for that matter, and can be used with a variety of connector systems, including, for example, the MU, ST, FC, LC, MPX, and MPO connector systems. Although the present invention may be practiced with any connector system, it is particularly well suited for single-fiber ferrule connectors such as SC, MU, LC, ST, and FC type connectors.

As shown in FIGS. 1-3, the connector of the present invention comprises a locking component 13 that is preferably over-molded onto a jacketed optical cable 10 having a terminating optical fiber 11. As with the housing 18, the locking component has a top/bottom and front/back orientation wherein the front portion is to the right side of the figure and the back portion to the left.

The function of the locking component 13 is to adhere to the jacketed optical cable 10 having a terminating optical fiber 11 and to axially secure the cable 10 to, and the terminating optical fiber 11 within, connector housing 18. The locking component 13 is over-molded onto jacketed optical cable 10 and has a front end 20 from which terminating optical fiber 11 extends for presentation to a ferrule assembly 30 and into housing 18. Locking component 13 further comprises at least one locking lug 14 comprising a rearward surface 21 and a forward surface 22. Component 13 is configured to be insertable into housing 18, and movable in forward and radial directions relative to housing 18, to position at least one locking lug 14 in a corner 19 of housing 18 (for example, as shown in FIG. 3). When positioned in a corner, the rearward surface 21 of a locking lug 14 abuts and interferes with a mating surface 31 of housing 18 to prevent rearward axial movement and the forward surface 22 of locking lug 14 abuts and interferes with mating surface 32 of housing 18 to prevent forward axial movement therebetween.

The locking component of the present invention may comprise any cross-sectional shape suitable to allow such component to be fit snugly, yet be moveable, within a housing to position at least one locking lug therein within a corner of a housing to secure the two together in an axial direction. For example, the locking component may have a cross-section that is generally rectilinear, i.e. triangular, square, rectangular, pentagonal, hexagonal, and the like, or generally round/oval when being inserted into a housing comprising an opening/inner chamber that has a radial cross-section that is generally round. In such embodiments, it is preferred that a rectilinear locking component be shaped to fit within the housing inner chamber with at least three corners thereof touching the inner surface. In certain embodiments wherein the connector housing defines an opening/inner chamber that is other than generally round, it is preferred that the cross-section of the locking component be generally round/oval-shaped. In certain particularly preferred embodiments, the locking components of the present invention have a generally round/oval radial cross-sectional shape, as shown, for example in FIGS. 5 and 5a-5e.

The locking component of the present connector may comprise any suitable number of locking lugs. Preferably, the number of locking lugs on the locking component is from one to the number of corners in the cross-sectional shape of the connector to which the component is to be secured. For example, in a connector comprising a housing having a generally square or rectangular housing, the locking component to be secured thereto preferably has from about 1 to about 4 locking lugs. Accordingly, in certain preferred embodiments, the locking components of the present invention comprise from 1 to 8, more preferably from 1 to 4, even more preferably from 2 to 4, and even more preferably 2 locking lugs. In certain further preferred embodiments, the number of lugs on a locking component is selected for a given application to equal the number of receiving slots on the inner housing 18 to be secured thereto.

Figure 4:
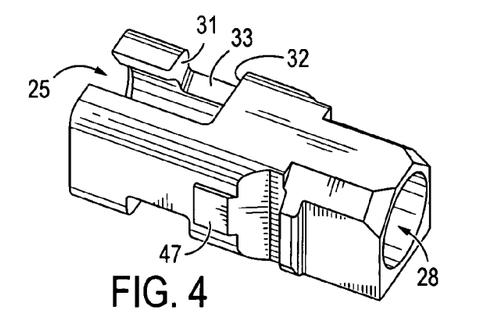
FIGS. 4-4g show various views of a preferred embodiment of an inner housing of the connector of the present invention.
Figure 4A:
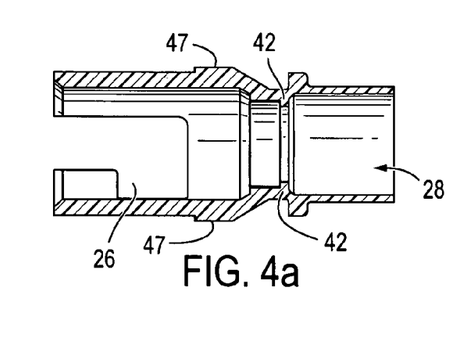
Figure 4B:
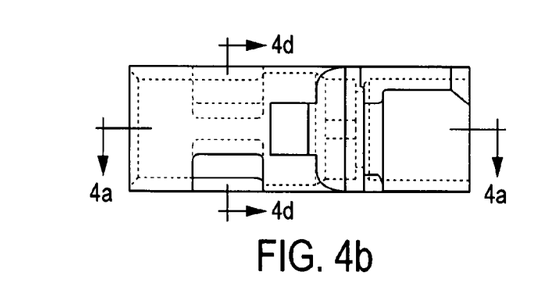
Figure 4C:
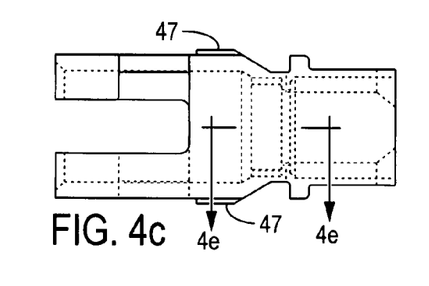
Figure 4D:
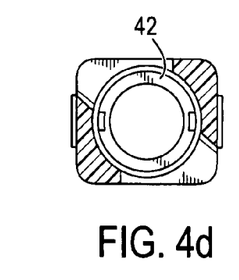
Figure 4E:
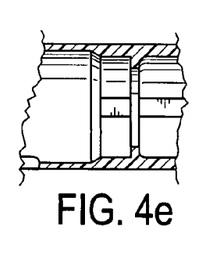
Figure 4F:
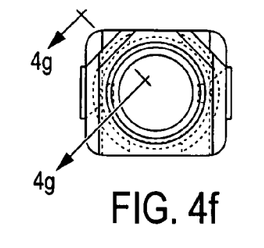
Figure 4G:
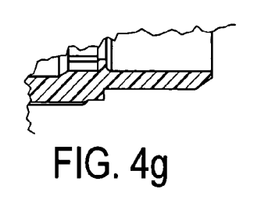
Figure 5:
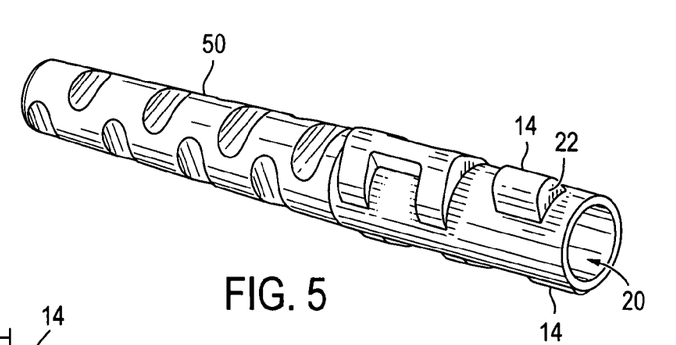
FIGS. 5-5b show various views of a preferred embodiment of a locking component and strain relief component of the connector of the present invention.
Figure 5A:
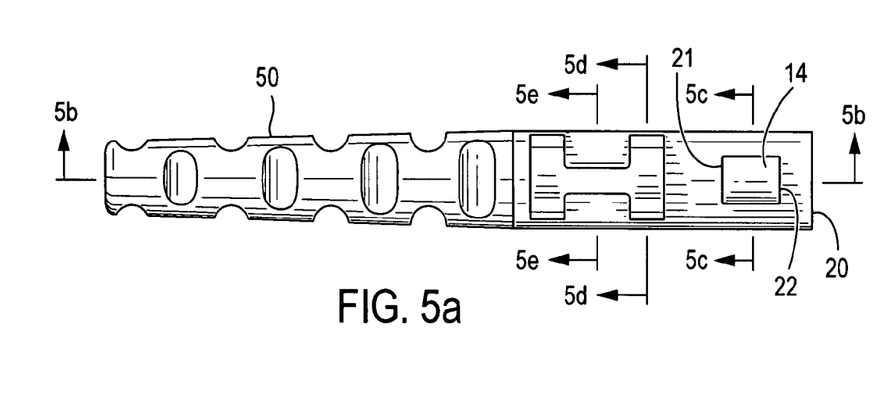
Figure 5B:
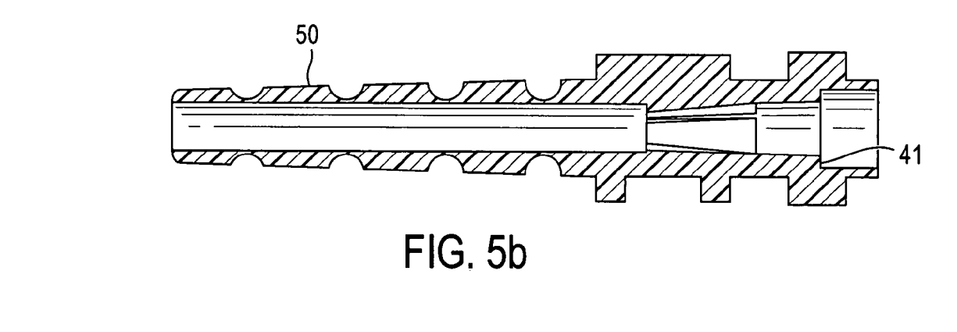
Figure 5C:
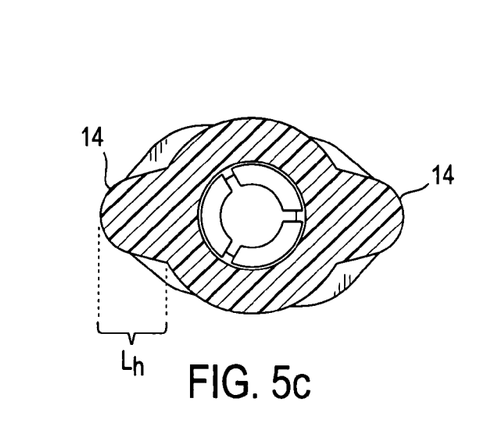
FIGS. 5c-5e show various radial cross-sectional views of a preferred embodiment of a locking component of the present invention.
Figure 5D:
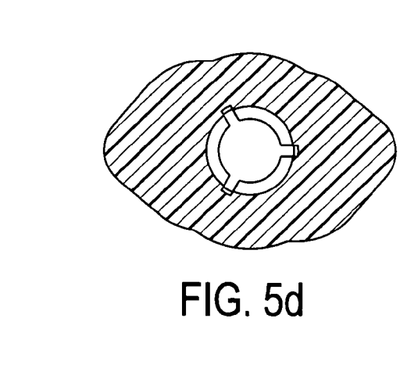
Figure 5E:
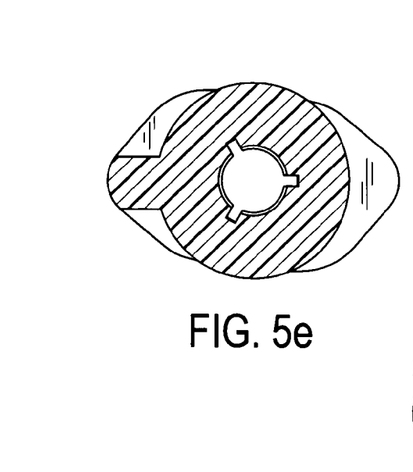

The locking lugs of the locking component may, themselves, be of any shape suitable to present a forward and rearward surface which abuts and interferes with mating surfaces of a housing to prevent axial movement therebetween. In general, applicants have recognized that the larger the surface area of the forward and rearward surfaces of a locking lug which contact a portion of the housing, the more effective the lug is at preventing axial movement therebetween. Accordingly, the locking lugs 14 are preferably configured to maximize the surface areas 21 and 22 presented for contact with mating surfaces of the housing 18. Nevertheless, it is generally desirable that the lugs not extend radially beyond the cross-section profile of the housing when positioned within a corner of the housing 18. In certain preferred embodiments, a lug of the present invention has a lug height $L_h$ (which, as shown in FIG. 5(c) is measured from the locking component base to the tip of the lug) that is at least as long as the minimum wall thickness $T_{min}$ of housing 18. As shown in FIG. 4(f), the $T_{min}$ of housing 18 is defined to be the shortest distance from a point on the surface of inner chamber 29 to a point outer surface of housing 18. In certain preferred embodiments, a lug of the present invention has a lug height equal to from about 1.05 times to about 2.0 times, preferably from about 1.05 to about 1.5 times, and more preferably from about 1.2 to about 1.5 times the $T_{min}$ of the inner housing with which it engages.

As shown, for example, in FIG. 3, the locking lugs 14 are preferably configured to have an outer contour which, when the lug is positioned in a corner 19 of housing 18, is generally flush with the outer contour of that corner. In certain preferred embodiments, the at least one lug 14 of the present invention is/are configured to have a radial cross-section that is generally "gumdrop" shaped, as shown in FIG. 5(c).

In certain preferred embodiments, the locking component 13 of the present invention further serves to provide a backstop for a resilient member 40 which engages the rear of a ferrule assembly 30 wherein optical fiber 11 resides in connector 1. To perform such function, in certain embodiments, locking component 13 is configured with an annular shelf 41, shown, for example, in FIG. 5b, against which the rear end of the resilient member 40 is configured to seat. The compressive force of the resilient member 40 against the shelf 41 causes the resilient member to urge the ferrule assembly 30 forward relative to the front of housing 18 until a base portion of the ferrule assembly contacts an annular shoulder 42 located on the inside of the housing 18 which acts to stop the forward movement of the ferrule assembly in housing 18.

To achieve the aforementioned functions, the locking component of the present invention is preferably formed from a material capable of being formed/adhered onto the cable jacket without melting the jacketed cable and forming one or more protrusions/locking lugs having sufficient strength to secure the optical cable to the housing without significant shear or stretching of the lugs under axial stress. More particularly, in certain preferred embodiments, the locking component of the present invention is formed from a material exhibiting one or more, and preferably all, of the melting point, tensile strength/yield strength, durometer, and tensile modulus properties discussed below.

According to certain preferred embodiments, the moldable material for use in forming the locking component of the present invention has a melting point that is sufficiently low to allow the material to be melted and formed onto the jacketed cable without also melting substantially the jacket material. Preferably, the moldable material for use in the present invention has a melting point of about 414° F. (212° C.), and more preferably of about 380° F. (193° C.) or less.

As will be recognized by those of skill in the art, the tensile and yield strength of the material needed to prevent locking lugs formed therefrom from undesirably shearing and/or stretching under axial stress will be dependent, at least in part, on the geometry/surface area of the lugs formed. That is, as noted above, the greater the area of surfaces 21 and 22 of each at least one lug 14 that interfere with a surface 31 or 32 of housing 18, the lower the tensile and yield strength need be to prevent shear and stretch of the lug upon axial stress. In addition, the greater the axial length of each lug 14, the less strength needed to prevent shearing thereof. Preferably, the moldable material used to form the present lugs is a material having sufficient tensile and yield strength to prevent significant stretching or shearing of the lugs formed therefrom under the load requirement of Standard test TIA 568 B. Accordingly, in certain embodiments, the tensile and yield strength of the moldable material for use in the present invention exhibits a tensile strength and a yield strength, each of about 2 megapascals (Mpa) or greater, as measured using standard test method ISO 527. Preferably, the moldable materials exhibit a tensile and yield strength of about 5 Mpa or greater, and more preferably about 8 Mpa or greater.

In preferred embodiments, the material of the present invention has a durometer sufficient to retard the stretching of lugs formed therefrom under axial stress. Preferably, the moldable material has a durometer shore of about 38 durometer-hardness (D) to about 75 D, more preferably from about 45 D to about 65 D, as measured using standard test method ISO 868.

Furthermore, as will be discussed in further detail below, in certain preferred embodiments, it is desirable for the present moldable material to be used not only to form the locking component 13 of a present connector but also a stress-relief component 50. In such preferred embodiments, it is thus desirable to use a material to form both locking and stress-relief components which exhibit not only the properties discussed above, but also sufficient flexibility to form a functioning stress-relief component (discussed in detail below). According to certain preferred embodiments, the moldable material for forming a locking component of the present invention further exhibits a flexural modulus of about 50 to about 1200 Mpa, as measured using standard test method ISO 178. More preferably, the moldable material exhibits a flexural modulus of about 150 to about 900 Mpa, and even more preferably of from about 150 to about 350 Mpa.

Any of a variety of moldable-type materials exhibiting one or more, and preferably all, of the above characteristics can be used to form the locking component of the present invention. Examples of types of materials suitable for use herein include thermoplastic elastomers, thermoplastic copolyester elastomers, polyvinylchlorides, and the like. According to certain preferred embodiments, the moldable material comprises a thermoplastic copolyester elastomer. A variety of such preferred materials are available commercially including, for example, the thermoplastic copolyester elastomer designated under the trade name Arnitel EL630 Black, available from DSM.

Applicants have further recognized that the moldable material for use in the present invention may comprise relatively higher percentages of recycled, re-grind materials than the over-mold materials used to form snap-fit components on prior art connectors. Such a higher percentage of re-grind materials tends to further reduce the costs associated with the connectors of the present invention. In certain preferred embodiments, the moldable materials may comprise up to 25%, and preferably, up to 50% regrind material by weight, based on the total weight of moldable material.

Any of a variety of conventional over-molding techniques can be adapted for use to form the locking component of the present invention. In light of the disclosure herein, those of skill in the art will be readily able to produce over-molded locking components of the present invention, without undue experimentation.

The inner housing 18 of the present connector serves at least two primary functions. First, housing 18 serves to hold and align a ferrule assembly, into which an optical fiber is inserted, such that the forward end of the ferrule is positioned to be capable of optically coupling to a mating connector when the present connector is mated therewith. Referring to FIGS. 2-4, and 4(a)-4(f), housing 18 defines an inner chamber 29 that is configured to receive a ferrule assembly 30 from the back end. At least a portion of inner chamber 29 has a cross-sectional shape that is similar to, and abuts, a collar 35 of the intended ferrule assembly. The fit of the collar 35 in chamber 29 serves to aide the alignment of the ferrule within housing 18. The ferrule is received in the back end of the housing and is moved forward such that the ferrule resides within the housing 18 in a position where the front face 37 of the ferrule protrudes through a front opening 28 of housing 18. Housing 18 comprises an annular shoulder 42 which interferes with a collar 35 of ferrule assembly 30 and prevents the forward movement of the collar 35 beyond shoulder 42. In certain preferred embodiments, the ferrule assmebly 30 is held in place against shoulder 42 via a resilient member 40 which, when the connector is assembled, urges the ferrule forward.

In a second primary function, housing 18 cooperates with locking component 13 to secure the two components together in an axial direction. Housing 18 is configured to receive locking component 13. In particular, referring to FIGS. 2-4, the rearward end of housing 18 defines an opening 25 for receiving component 13, including at least one slot 26 for receiving each locking lug 14 of component 13. Opening 25 and slot(s) 26 are configured to allow component 13 to be inserted in both forward and axial directions within housing 18 to position the lug(s) 14 in a corner 19 of the housing. Each slot 26 comprises a corner portion defined on three sides by a first mating surface 31, a second mating surface 32, and a third mating surface 33. The corner portion is configured such that a lug 14 positioned therein abuts and interferes with both the first and second mating surfaces to prevent axial movement of the lug within the corner of slot 26, and thus, secure housing 18 and locking component 13 together in an axial direction. The corner portion is further configured such that a lug 14 positioned therein abuts and interferes with the third mating surface to prevent further radial movement in the direction of the third mating surface.

The inner housing 18 of the present connector may comprise any suitable radial cross-sectional shape. Examples of suitable cross-sectional shapes include rectilinear shapes having at least corners, including, triangular, square, rectangular, pentagonal, hexagonal, heptagonal, octagonal, and the like. In certain preferred embodiments, the housing cross-sectional shape is generally square or rectangular, as shown, for example, in FIGS. 1-3, 4(d) and 4(f).

Additionally, the inner chamber defined by the inner housing of the present connector may comprise any suitable radial cross-sectional shape. Preferably, the inner chamber has a radial cross-section that is generally round.

Furthermore, the inner housing of the present connectors may define any suitable number of slots for receiving locking lugs. Preferably the inner housing comprises a number of slots equal to from 1 to the number of corners in the radial cross-sectional shape of the connector. In certain preferred embodiments, the present inner housing comprises from 1 to 8 slots. More preferably, the inner housing comprises from 2 to 4 slots, and even more preferably 2 slots. In preferred embodiments, the number of slots is selected for a given application to equal the number of lugs presented on a locking component to be secured thereto.

According to certain preferred embodiments, the inner housing further serves to provide a means for connecting an outer housing thereto. The inner housing may provide any suitable means for connecting any outer housing to an inner housing. Referring to FIGS. 3, 4, and 4c, in preferred embodiments, inner housing 18 comprises one or more protrusions 47 which engage receiving slots on an outer housing to provide an interference fit.

The inner housing of the present invention may comprise any suitable material of sufficient strength to interfere with the locking component to secure the two together. In general, it is preferred to use a material that is less flexible, i.e. more rigid and/or resilient, than the moldable material used for the locking component. Examples of suitable materials include any of a number of commercially available thermoplastics, such as those available from GE under the trade name Valox, including Valox 420 SEO, and the like.

As shown in FIGS. 1-3 and 5-5(b), in certain preferred embodiments, the present connector further comprises a strain relief component 50. The strain relief component 50 serves to support an optical cable and allow the optical fiber to flex and bend, but not beyond its tolerable bend radius. A wide variety of strain relief components are known in the art and can be adapted for use herein. Preferably, the strain relief component 50 of the present connector is over-molded onto the jacketed optical cable.

Applicants have recognized that the materials used in forming the over-molded locking components of the present invention are suitable for use in forming a strain relief component of the present invention. Accordingly, while in certain embodiments, the strain relief may be formed separately from the locking component, in preferred embodiments, the strain relief component of the present invention is formed integrally with the over-molded locking component, i.e. as one unitary component having a strain relief portion and a locking portion. Such a unitary component is shown, for example, in FIGS. 5-5(b).

Figure 6A:
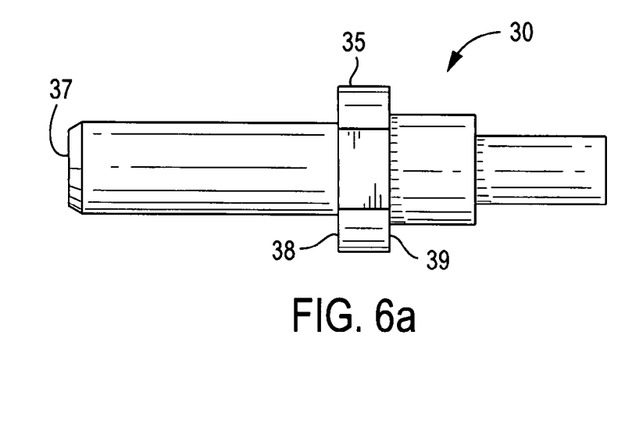
FIGS. 6a and 6b show two views of a preferred embodiment of a ferrule of the present invention.
Figure 6B:
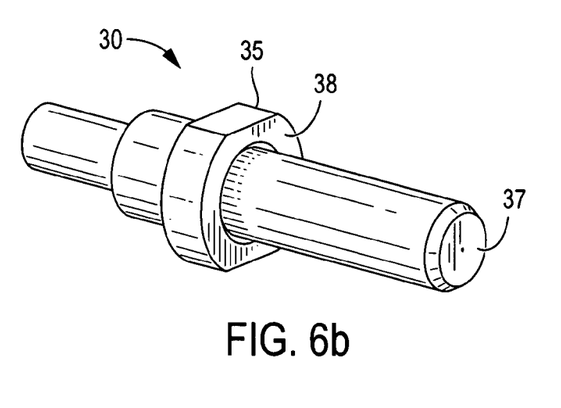

As noted above, the connectors of the present invention further comprise a ferrule assembly for receiving and aligning an optical fiber within the connector housing and presenting a forward face for optically connecting with a mating connector. Any suitable conventional ferrule and ferrule assembly can be adapted for use in the present connectors. Shown in FIGS. 6(a) and 6(b) are two views of a preferred ferrule assembly 30 comprising a ferrule collar 35 for use in the present connectors. Ferrule assembly 30 has a rear opening (not 5 shown) and at least one passage along an optical axis for receiving an optical fiber. Ferrule assembly 30 has a front face 37 which extends beyond the front end of connector 1 for connecting optically with a mating connector, when the connector is in an assembled configuration. Collar 35 of assembly 30 presents a front surface 38 which serves to abut an annular shoulder 42 of inner housing 18 to stop the assembly in a forward direction. The rear surface 39 of collar 35 serves to abut a resilient member which urges assembly 30 forward against shoulder 42. Collar 35 preferably has a radial cross-section that is similar in shape to the cross-section of the inner surface 29 of housing 18. Preferably collar 35 fits the inner surface 29 in such a manner to prevent the ferrule from deviating from the desired optical pathway.

Any suitable resilient member can be used in the preferred connectors of the present invention. As shown in FIGS. 1 and 2, certain preferred resilient members comprise a spring, such as a metal spring. In the connector 1, the resilient member 40 surrounds the rear of the ferrule sub-assembly 30 and abuts the rear surface 39 of the ferrule collar 35. The rear end of the resilient member abuts a rear surface, either a landing 41 of the locking component 13, or another rearward surface, which serves as a backstop for the resilient member and. allows the resilient member to urge the ferrule forward.

In preferred embodiments, the present connectors further comprise an outer housing 70, as shown in FIGS. 1-3. The outer housing serves to receive the inner housing securely and to prevent the radial motion of the locking lugs 14 located in the corners 19 of housing 18. Outer housing 70 defines an inner chamber 71 which is configured to receive inner housing snugly and, therefore, has a radial cross-sectional shape that is similar to that of inner housing 18. The embodiments shown in FIGS. 1-3 comprise preferred embodiments, wherein the radial cross-section of the inner 18 and outer 70 housings are both generally square/rectangular. The outer housing further defines a front passage 73 through which, upon assembly of a connector of the present invention, the front end of a ferrule protrudes for optically coupling with a mating connector.

When snugly fit over an inner housing 18 that is mated with locking component 13, the outer housing interferes with the radial movement of locking lugs 14 and prevents such lugs from being moved out of the corners 19 of housing 18. Therefore, upon mating of the outer housing over an inner housing/locking component assembly, the inner housing and locking component are secured together in both axial and radial directions.

The outer housing may be secured to the inner housing of the present connectors via any suitable conventional means. In certain preferred embodiments, the outer housing 70 and inner housing 18 are secured together via interference fit. In particular, in certain preferred embodiments outer housing 70 defines one or more outer slots 72, each for receiving and interfering with a mating snap 47 (shown clearly in FIGS. 4, 4(a), and 4(c)) located on the outer surface of inner housing 18. Upon insertion of inner housing 18 into outer housing 70, the mating snaps 47 are first deflected by, then received in the outer slots 72 of, outer housing 70 to provide an interference fit therebetween and secure the two housings together.

The outer housing of the present invention may comprise any suitable material of sufficient strength to interfere with the inner housing to secure the two together. In general, it is preferred to use a material that is less flexible, i.e. more rigid, than the moldable material used for the locking component. Examples of suitable materials include any of a number of commercially available thermoplastics, such as those available from GE under the trade name Valox, including Valox DR48, and the like.

Thus, as described above, the optical connectors of the present invention provide for a relatively simple-to-manufacture and simple-to-repair connector in which an optical fiber is robustly secured within the connector housing using locking components that are manufactured from moldable materials that are relatively inexpensive and flexible as compared to conventional connector locking component materials.

What is claimed is:

1. An optical fiber connector having a top and bottom, front and back orientation comprising:
    a jacketed optical cable comprising a terminating fiber, said cable having molded thereon a locking component comprising at least one locking lug, said locking component being formed from a flexible moldable material; and
    an inner housing having a radial cross-section which is generally rectilinear and comprises at least three corners, said inner housing comprising at least a portion which defines an opening for receiving said locking component, said opening being configured such that upon insertion of said locking component therein said locking component is movable in both forward and radial directions relative to said inner housing to position said at least one locking lug in a corner of said inner housing such that said locking component and inner housing are secured to each other in an axial direction.

2. The optical fiber connector of claim 1 wherein said flexible moldable material exhibits a flexural modulus of about 50 to about 1200 Mpa.

3. The optical fiber connector of claim 1 wherein said flexible moldable material exhibits a flexural modulus of about 150 to about 900 Mpa.

4. The optical fiber connector of claim 1 wherein said flexible moldable material exhibits a flexural modulus of about 150 to about 350 Mpa.

5. The optical fiber connector of claim 1 wherein said flexible moldable material has a melting point of about 414° F. (212° C.) or less.

6. The optical fiber connector of claim 5 wherein said flexible moldable material has a melting point of about 380° F. (193° C.) or less.

7. The optical fiber connector of claim 1 wherein said flexible moldable material exhibits a tensile strength of about 2 Mpa or greater.

8. The optical fiber connector of claim 7 wherein said flexible moldable material exhibits a tensile strength of about 8 Mpa or greater.

9. The optical fiber connector of claim 1 wherein said flexible moldable material exhibits a yield strength of about 2 Mpa or greater.

10. The optical fiber connector of claim 9 wherein said flexible moldable material exhibits a tensile strength of about 8 Mpa or greater.

11. The optical fiber connector of claim 1 wherein said flexible moldable material exhibits a durometer of about 38 D to about 75 D.

12. The optical fiber connector of claim 11 wherein said flexible moldable material exhibits a durometer of about 45 D to about 65 D.

13. The optical fiber connector of claim 1 wherein said flexible moldable material is selected from the group consisting of thermoplastic elastomers, thermoplastic copolyester elastomers, and polyvinylchlorides.

14. The optical fiber connector of claim 1 wherein said locking component has a generally round radial cross-section shape.

15. The optical fiber connector of claim 1 wherein said locking component comprises from about 2 to about 4 locking lugs.

16. The optical fiber connector of claim 1 wherein said locking component comprises 2 locking lugs.

17. The optical fiber connector of claim 16 wherein said inner housing defines 2 slots, each capable of receiving a locking lug.

18. The optical fiber connector of claim 1 wherein said inner housing has a generally square-or rectangular-shaped radial cross-section.

19. The optical fiber connector of claim 1 wherein said inner housing defines from about 2 to about 4 slots, each capable of receiving a locking lug.

20. The optical fiber connector of claim 1 further comprising a strain relief component.

21. The optical fiber connector of claim 20 wherein said strain relief component is formed of the same flexible material as the locking component.

22. The optical fiber connector of claim 21 wherein said strain relief component and locking component are integrally formed.

23. The optical fiber of connector of claim 1 further comprising a ferrule assembly disposed in the inner housing, said ferrule having at least one passage along an optical axis to receive a fiber.

24. The optical fiber of connector of claim 1 further comprising an outer housing into which said inner housing having a locking component positioned in a corner therein is insertable to prevent radial movement of said locking lug out of said corner.

25. The optical fiber of connector of claim 1 wherein said outer housing has a radial cross-sectional shape that is similar to the radial cross-sectional shape of the inner housing.

26. An optical fiber connector having a top and bottom, front and back orientation comprising:
a jacketed optical cable comprising a terminating fiber, said optical cable having molded thereon a molded component comprising a locking portion having at least one locking lug and a strain relief portion, said molded component being formed from a thermoplastic copolymer elastomer material which exhibits: a flexural modulus of about 150 to about 350 Mpa; a melting point of about 414° F. (212° C.) or less; a tensile and yield strength of about 8 Mpa or greater; and a durometer of about 45 D to about 65 D; and
an inner housing having a radial cross-section which is generally rectilinear and comprises at least three corners, said inner housing comprising at least a portion which defines an opening for receiving said locking component, said opening being configured such that upon insertion of said locking component therein said locking component is movable in both forward and radial directions relative to said inner housing to position said at least one locking lug in a corner of said inner housing such that said locking component and inner housing are secured to each other in an axial direction.

27. The optical fiber connector of claim 26 wherein said at least one locking lug has a lug height that is equal to from about 1.05 times to about 2.5 times the length of a minimum wall thickness of the inner housing.

* * * * *